A. P. M. SCARPA.
LOOP FASTENER FOR GARTERS.
APPLICATION FILED FEB. 13, 1914.
1,190,016.
Patented July 4, 1916.
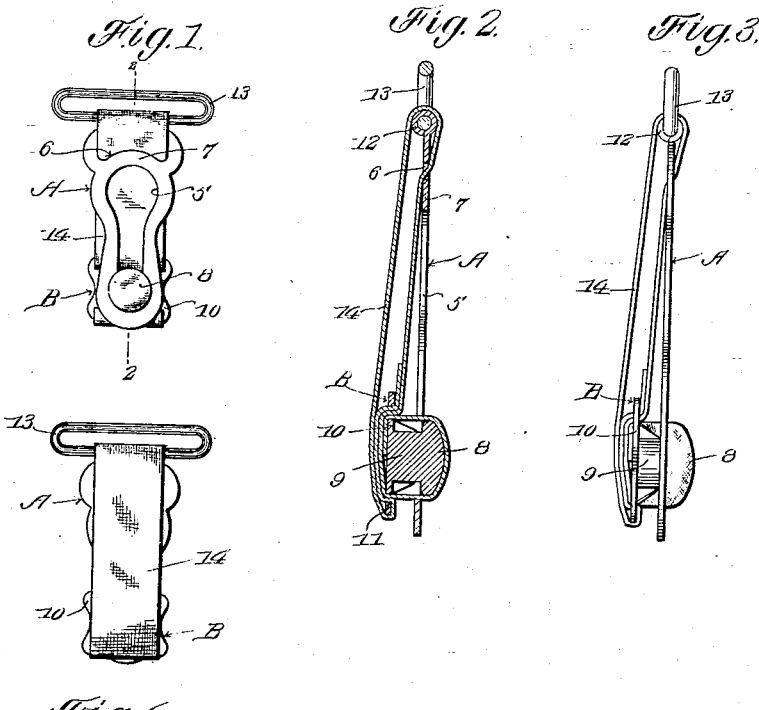
Witnesses
Inventor
A.P.M. Scarpa,
By Victor J. Evans
Attorney

UNITED STATES PATENT OFFICE.

ANTHONY P. M. SCARPA, OF DERBY, CONNECTICUT.

LOOP-FASTENER FOR GARTERS.

1,190,016.  Specification of Letters Patent.  Patented July 4, 1916.

Application filed February 13, 1914. Serial No. 818,562.

*To all whom it may concern:*

Be it known that I, ANTHONY P. M. SCARPA, a citizen of the United States, residing at Derby, in the county of New Haven and State of Connecticut, have invented new and useful Improvements in Loop-Fasteners for Garters, of which the following is a specification.

The invention relates to tabs, and more particularly to the class of loop fasteners for garters or the like.

The primary object of the invention is the provision of a fastener of this character wherein the tab supporting the stud and loop can be trained therethrough without requiring the stitching of the tab for the securing of the stud and loop thereon.

Another object of the invention is the provision of a fastener of this character wherein the tape for supporting the parts of the said fastener is trained through the parts in a manner to hold the same in coöperative relation to each other without necessitating any stitching or otherwise fastening of the tape thereto for supporting the parts of the fastener.

A further object of the invention is the provision of a fastener of the character described which is simple in construction, thoroughly reliable and efficient in its purpose, strong, durable, and inexpensive in manufacture.

With these and other objects in view, the invention consists in the construction, combination and arrangement of parts as will be hereinafter fully described, illustrated in the accompanying drawing, and pointed out in the claim hereunto appended.

In the drawing:—Figure 1 is a plan view of a fastener constructed in accordance with the invention. Fig. 2 is a sectional view on the line 2—2 of Fig. 1. Fig. 3 is an edge elevation. Fig. 4 is a view similar to Fig. 1, looking toward the opposite side of the fastener.

Similar reference characters indicate corresponding parts throughout the several views in the drawing.

Referring to the drawing in detail, the fastener comprises a loop member A and stud member B, the same being supported in operative relation to each other in a manner presently described. The loop member A is formed with a key-hole shaped slot 5 which extends throughout a greater portion of the length thereof, while the remaining portion is provided with an arcuate-shaped slot 6 which is separated from the slot 5 through the medium of the cross bar 7 of the loop member, the slot 5 being adapted to receive at its larger end the head 8 of the stud member B so that its shank 9 will pass into the narrow portion of the slot 5 for the fastening of the stud member B to the loop member A when securing the tab or fastener to a garment or hose. The shank 9 is mounted in a base 10 which is provided with slots 11 at opposite sides of the shank 9, the loop member B being formed at one end with a sleeve 12 in which is loosely connected a loop 13 for the connection of the fastener to a suspension strap in the usual well-known manner. Trained through the slot 6 in the loop member A and the loop 13 is a tape 14, the ends of which are passed in reverse directions through the slots 11 in the base, while a portion of the tape is extended over the head 8 of the stud member B so as to overlie the said head, one end terminating between the base 10 and the portions of the tape overlying a portion of one face of the base, while the other end is extended parallel for a short distance of one stretch of the tape. Thus, in this manner the loop and stud members A and B respectively, are mounted upon the tape, which serves as a tab therefor.

From the foregoing it is thought that the construction and manner of use of the device will be clearly understood, and therefore a more extended explanation has been omitted.

What is claimed is:—

The combination with a loop member and a stud member, said loop member having a slot formed in the upper end thereof, a base formed on said stud member and having slots formed therein, said slots being arranged at opposite points on said stud member, and a tape comprising a single piece of material trained over the upper end of the loop member and through the slot therein, and having the ends thereof passing in reverse directions through the slots in the base, one of the ends passing over the stud and then trained through one of the slots in the base and terminating beneath the base.

In testimony whereof, I affix my signature in presence of two witnesses.

ANTHONY P. M. SCARPA.

Witnesses:
GEO. H. HARDING,
J. D. ELMENDORF.

Copies of this patent may be obtained for five cents each, by addressing the "Commissioner of Patents, Washington, D. C."